United States Patent [19]

Oles et al.

[11] Patent Number: 4,801,260
[45] Date of Patent: Jan. 31, 1989

[54] ROTARY BLOW MOLDING MACHINE

[75] Inventors: Paul M. Oles; Frederick J. Shepps, both of York, Pa.

[73] Assignee: Graham Engineering Corp., York, Pa.

[21] Appl. No.: 175,603

[22] Filed: Mar. 30, 1988

Related U.S. Application Data

[63] Continuation of Ser. No. 28,975, Mar. 23, 1987, abandoned.

[51] Int. Cl.[4] .............................................. B29C 49/00
[52] U.S. Cl. ...................................... 425/527; 425/531; 425/532; 425/533; 425/536; 425/538; 425/540; 425/541; 425/451.5; 425/451.9; 425/592
[58] Field of Search .............................. 425/538–541, 425/532, 533, 451.5, 451.9, 593, 533, 592, 536, 451.6, 450.1, 527, 531

[56] References Cited

U.S. PATENT DOCUMENTS

| Re. 32,129 | 4/1986 | Aoki | 425/540 |
|---|---|---|---|
| 2,901,769 | 9/1959 | Sherman et al. | 18/5 |
| 2,952,034 | 9/1960 | Fortner | 18/5 |
| 3,025,562 | 3/1962 | Nelson | 18/5 |
| 3,115,673 | 12/1963 | Rudolph | 18/5 |
| 3,243,847 | 4/1966 | Fogelberg et al. | 18/5 |
| 3,334,379 | 8/1967 | Di Settembrini | 18/5 |
| 3,496,600 | 2/1970 | Heston | 18/5 |
| 3,516,118 | 6/1970 | Gallay | 18/5 |
| 3,555,598 | 1/1971 | Mehnert | 18/5 |
| 3,614,807 | 10/1971 | Lagoutte | 18/5 |
| 3,764,250 | 10/1973 | Waterloo | 425/326 |
| 3,963,404 | 6/1976 | Pollock et al. | 425/540 |
| 4,421,472 | 12/1983 | Martin | 425/527 |
| 4,560,341 | 12/1985 | Itafele | 425/541 |
| 4,582,474 | 4/1986 | Ziegler | 425/503 |
| 4,589,838 | 5/1986 | Ziegler | 425/540 |
| 4,673,347 | 6/1987 | Ziegler | 425/538 |

FOREIGN PATENT DOCUMENTS

| 34823 | 9/1972 | Japan | 425/540 |
|---|---|---|---|
| 2094220 | 9/1982 | United Kingdom | 425/540 |

Primary Examiner—Bernard Nozick
Attorney, Agent, or Firm—Thomas Hooker

[57] ABSTRACT

A rotary blow molding machine includes a base, a turntable on the base rotatable about a vertical axis and a number of mold units spaced around the turntable. Each mold unit includes a pair of mold halves which close on and capture a growing vertical parison at an extrusion station and then fall away from the parison as the parison is severed. The captured parison is blow molded and cooled as the blow unit is rotated around the turntable. The finished article, commonly a bottle, is ejected from between the mold halves before the mold halves return to the extrusion station.

30 Claims, 5 Drawing Sheets

ROTARY BLOW MOLDING MACHINE

This is a continuation of co-pending application Ser. No. 028,975, filed on Mar. 23, 1987, now abandoned.

BACKGROUND OF THE INVENTION

The invention relates to horizontal rotary blow molding machines and methods for manufacturing bottles and similar articles from thermoplastic resin parisons.

BRIEF DESCRIPTION OF THE PRIOR ART

Horizontal rotary blow molding machines index circumferentially spaced mold halves in steps around a vertical axis. The mold halves each capture a vertical, continuously growing parison at an extrusion station. In one machine the head extruding the parison moves up away from the mold halves after the mold halves close to capture the parison. The parison is severed adjacent the top of the mold halves, the mold halves are moved away from the extrusion station and a top blow pin is moved into the end of the captured parison at the top of the mold halves to seal the mold cavity and blow the parison. Subsequently, the extrusion head and dependent parison are lowered back to the initial position so that the new parison is in position to be captured by the next pair of mold halves. The blow parison cools as the mold halves are rotated around the machine, following which the mold halves open at an ejection station and the finished article, commonly a bottle, is ejected from between the mold halves. The machine includes an in-mold labeling station between the ejection station and the extrusion station for applying labels to the interior surfaces of the mold cavities.

Blowing of the captured parison is delayed until after the mold is moved away from the extrusion head and the blow pin has been moved into engagement with the top of the held parison. This interval of time increases the cycle time for the machine. A mechanism is required to raise and lower the extrusion head. Moving the extrusion head may move the growing parison with the ever-present risk that this movement will cause the end of the long, growing parison to shift laterally, thereby increasing the risk that the parison is not properly aligned when captured in the mold cavity.

When blow molding bottles using a blow pin entering the cavity at the top of the mold, there is a risk that the molten parison resin will gravity-flow down from the top of the cavity before the pin is extended into the cavity and confines the top of the parison against and the cavity mouth. This risk is increased in a machine where the captured parison must be moved a distance away from the extrusion head before the blow pin is inserted down into the mouth at the top of the mold.

In another horizontal rotary blow molding machine the parison grows down over a blow pin at the bottom of the mold halves prior to closing of the mold havles. The extrusion head is moved up above the closed mold prior to severing of the new parison from the captured parison. The mold is then indexed laterally to the next station without dropping and the captured parison is blown within the cavity. In a further horizontal rotary blow molding machine, the whole turntable supporting all of the mold halves is raised and lowered during rotation as each mold captures a parison at the extrusion station.

SUMMARY OF THE INVENTION

The present horizontal rotary blow molding machine indexes a number of mold halves around the circumference of a turntable past a plurality of stations. Elevated blow molds are indexed to an extrusion station to either side of a vertically growing parison extending down from a fixed extrusion head. The mold halves close to capture the parison and are then immediately dropped vertically below the extrusion head at a rate faster than the rate of parison growth. As the closed mold drops the parison is severed, either by tensile-breaking a weakened portion of the parison above the mold halves or by a cutting knife. When captured, the lower end of the parison extends over a blow pin located below the mold. Following closing of the mold halves on the parison blow air is flowed through the blow pin into the interior of the parison to expand the parison against the mold cavity. The lower end of the parison captured between the blow pin and the mouth of the cavity is confined and cannot flow away from the pin. The mold may be indexed away from the extrusion station immediately after severing of the captured parison.

The mold halves close on the parison and quickly move down from the stationary extrusion head and forming new parison without laterally disturbing the new parison. Blow molding commences immediately upon closing of the mold halves. Thes steps permit the machine to rapidly blow mold the parison, thereby decreasing the amount of time required to cycle the individual mold halves around the machine and make the blow molded articles, commonly bottles. The new parison grows straight down in position to extend over the blow pin of the next elevated mold moved to the extrusion station.

Each pair of mold halves is mounted on a movable mold unit for vertical movement relative to the extrusion head. A cam raises the mold unit to the elevated position from which the mold unit is indexed to the extrusion station and supported on a movable pad. After closing of the mold halves to capture the parison the pad is rapidly withdrawn, allowing the mold unit to gravity-fall away from the new growing parison. The falling mold unit engages a pair of shock absorbers which slow the unit before engaging a pair of supports. The mold unit may be indexed away from the extrusion station after severing of the parison and before the unit has fallen all the way down to the supports.

The machine also includes an improved mold clamp drive for moving both mold halves toward each other to capture the parison between the mold halves. The drive is actuated by a driver located radially inwardly of the mold halves. The drive forces the inner mold half radially outwardly along a pair of slide bars. The inner mold half is pushed by a clamp rod located a distance above the slide bars. The motion of the clamp drive is transmitted under the mold halves by actuating rods to a pivot bar located radially outwardly of the mold halves and then back to the mold halves, reversed in direction, by a second clamp rod. The clamp rods and actuating rods are located equal distances above and below the slide bars so that the mold halves are closed without subjecting the slide bars to high torsional forces. These forces could bend the slide bars and could prevent proper closing of the mold cavity.

Other objects and features of the invention will become apparent as the description proceeds, especially when taken in conjunction with the accompanying drawings illustrating the invention, of which there are six sheets and one example.

BRIEF DESCRIPTION OF THE DRAWINGS

FIG. 7 is a partially broken away view taken along line 7—7 of FIG. 3;

FIG. 9 is a sectional view taken generally along line 9—9 of FIG. 7.

DETAILED DESCRIPTION OF THE PREFERRED EXAMPLE OF THE INVENTION

Figure 1:
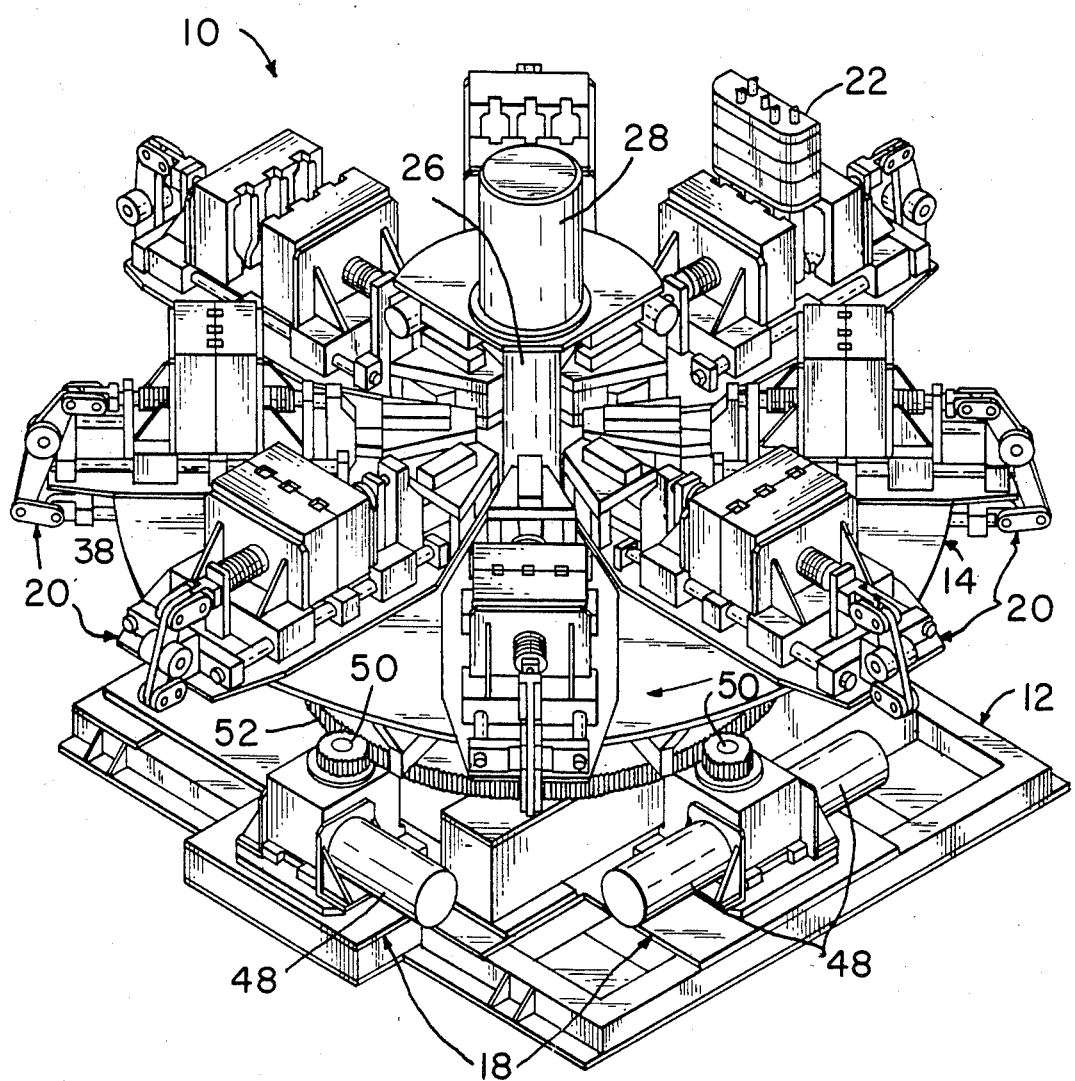
FIG. 1 is a perspective view of a rotary blow molding machine according to the invention.

Rotary blow molding machine 10 includes base 12, a turntable 14 mounted on the base for rotation around a vertical axis in the direction of arrow 16 and a turntable drive 18 on the base engagable with the turntable for indexing the turntable around the axis in steps. The turntable dwells for a period at each station 1 through 8.

Figure 3:
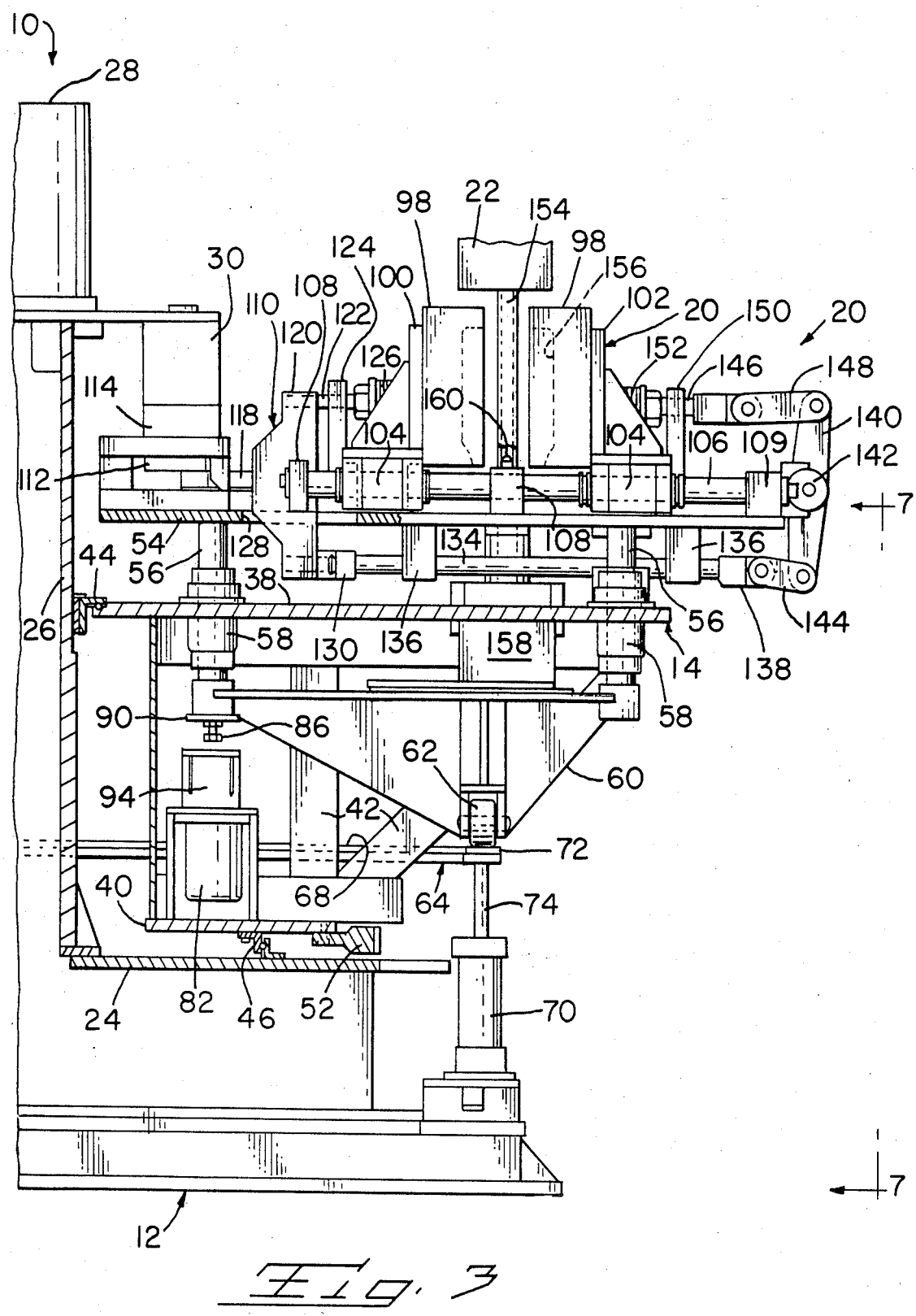
FIG. 3 is a vertical view taken generally along line 3—3 of FIG. 2.
Figure 4:
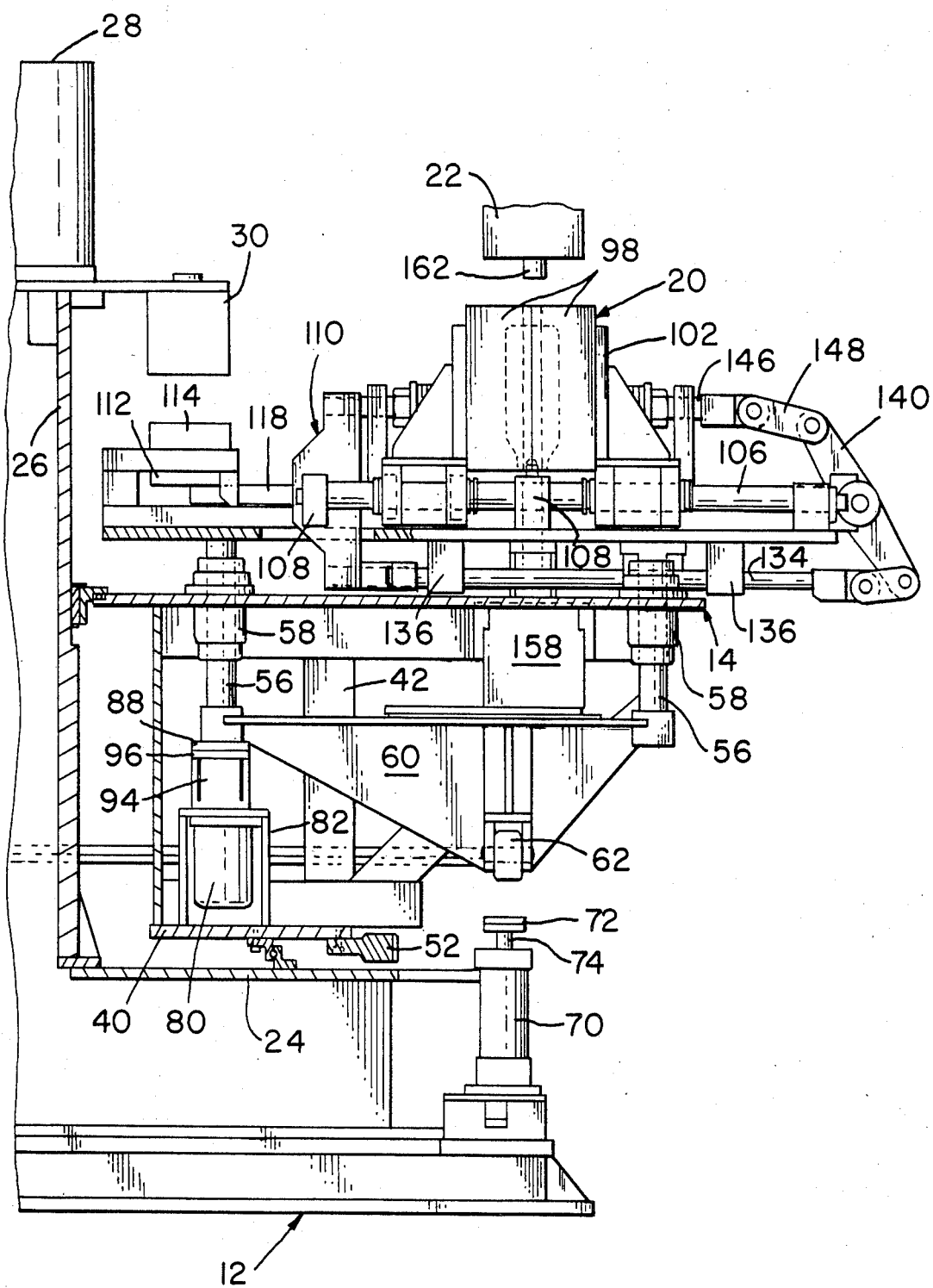
FIG. 4 is a view like FIG. 3 showing the mold halves closed.
Figure 5:
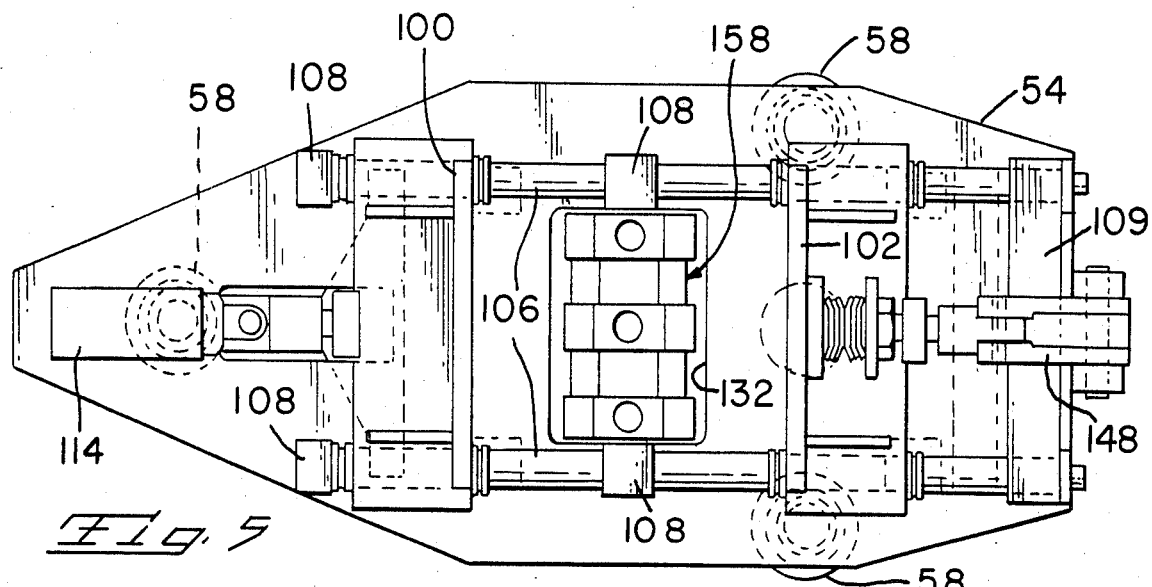
FIG. 5 is a top view, partially broken away, of the mold unit of FIG. 3.
Figure 6:
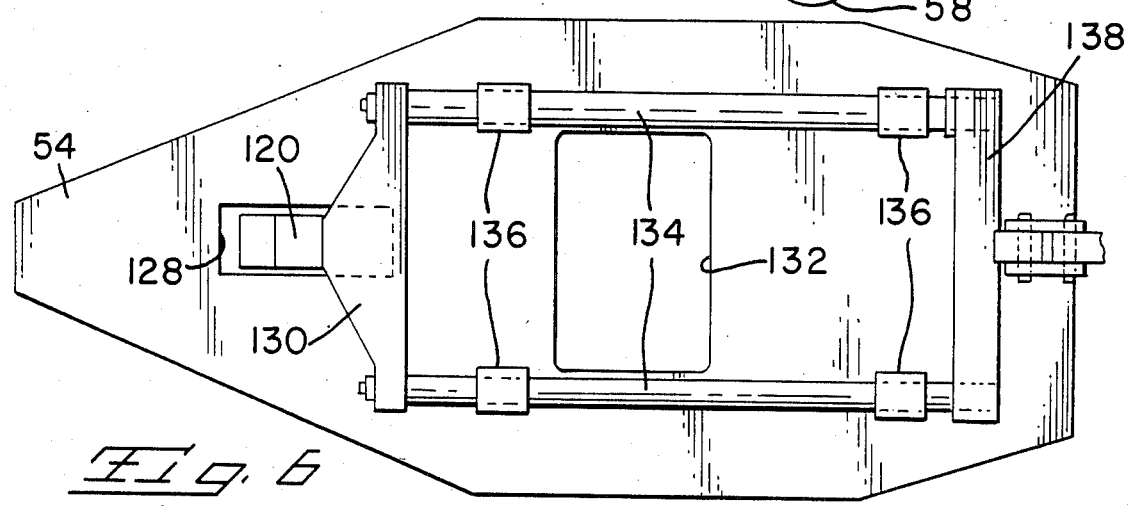
FIG. 6 is a partial bottom view of the mold unit of FIG. 5.

The turntable carries eight circumferentially spaced mold units 20. During a cycle of operation drive 18 indexes each unit 360 degrees around the machine from extrusion station 1, through molding and cooling stations 2-6, ejection station 7 and inmold labeling station 8 and then back to the extrusion station 1. A fixed extrusion die head 22 shown in FIGS. 3 and 4 is located above station 1 and extrudes a parison for each mold cavity. The parisons extruded by the head are captured in a mold halves carried by the mold units, blown and cooled as the mold units are indexed through stations 2 through 6. The resultant articles, commonly bottles, are ejected at station 7. An in-mold labeling device (not illustrated) may supply labels to the open empty mold cavities at station 8 prior to indexing of the mold unit back to station 1.

Base 12 includes a support plate 24 and a central control tower 26 extending upwardly from the plate and aligned with the rotational axis of the machine. A rotary union 28 is mounted on the top of the tower. The union connects each mold unit to suitable cooling water and pressure fluid lines. Driver 30 is mounted on the tower above the inner portion of station 1. Driver 32 is mounted on the tower above the inner portion of station 7. Each driver includes a drive head 34.

The turntable 14 includes upper and lower annular support plates 38 and 40 and suitable framing 42 joining the plates. The turntable is rotatably mounted on the base by bearings 44 and 46 respectively joining plate 38 to tower 26 and plates 40 to plate 24 for rotation of the turntable about the machine axis. Turntable drive 18 includes one or more electric motors 48 driving pinion gears 50 engagable with circumferential bull gear 52 mounted on plate 40.

Each mold unit 20 includes a mounting plate 54 located above support plate 38 and secured to the support plate by three vertical slide rods 56 secured to the bottom of the mounting plate and extending downwardly through sleeve bearings 58 on plate 38. The lower ends of rods 56 extend below plate 38 and are joined to support frame 60. Lift roller 62 is rotatably mounted on frame 60 at a location beneath the center of gravity of the mold unit. As shown in FIGS. 3 and 7, the roller 62 rotates about a radial axis.

Figure 8:
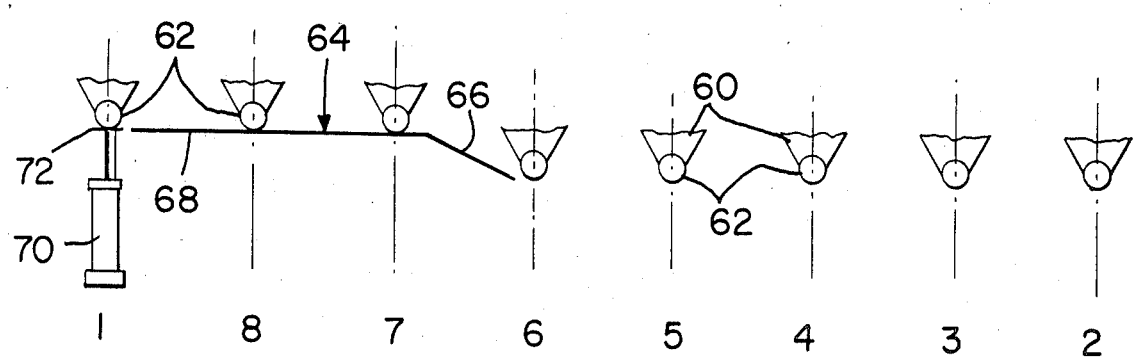
FIG. 8 is a diagrammatic view showing the lift cam, the vertical position of the mold assemblies at each station around the machine and the drop cylinder.

Lift cam 64 on base 12 extends around the circumference of the machine from shortly after station 6 to station 1. See FIGS. 3 and 8. The cam includes a rise surface 66 located between stations 6 and 7 and an elevated dwell surface 68 extending around the machine between stations 7 and 1. Hydraulic drop cylinder 70 is mounted on frame 12 at a position beneath roller 62 when a mold unit is in station 1. A support pad 72 is mounted on the end of cylinder rod 74. When the cylinder is extended the pad forms a continuation of dwell surface 68 to support the mold unit 20 at station 1 in an elevated position. Pad 72 also carries four alignment shafts 76 (only one of which is illustrated) which extend into bores in cylinder support 78 to prevent twisting and deflection of the pad as the mold unit is moved from the cam to the pad.

As mold units 20 are rotated between stations 6 and 7 rollers 62 engage the rise surfaces 66 and lift the mold units 20 to the position shown in FIG. 3. Following closing of the mold halves the cylinder 70 is rapidly retracted thereby permitting the mold units to fall from the position of FIG. 3 to the position of FIG. 4. A pair of shock absorbers 80 and 82 are mounted respectively on upper support plate 38 and lower support plate 40 as shown in FIGS. 3 and 7. Adjustable stops 84 and 86 are mounted respectively on plate 54 and the lower end of the inner slide rod 56 above shock absorbers 80 and 82. The stops extend through strike plates 88 and 90.

Each shock absorber includes a plunger 92 projecting toward the adjacent stop and into a support collar 94 having a resilient pad 96 on the upper end facing the adjacent strike plate. The plunger is connected to a dash pot located in the body of the absorber. Retraction of cylinder 70 permits the mold unit to fall until stops 84 and 86 engage the shock absorber plungers 92 to cushion the fall. Pads 96 also cushion the mold unit fall as the mold unit contact the supports 94.

Mold units 20 each carry a pair of complimentary mold halves 98 mounted in inner and outer platens 100 and 102. Each platen carries a pair of sleeve bushings 104 fitted on spaced parallel slide bars 106. The bars are mounted above plate 54 in support blocks 108 and an end block 109 which extends between the outer ends of the slide bars. The mold units each also include a mold clamp drive 110 for moving the platens and mold halves between open and closed positions. Drive 110 includes a actuator 112 mounted on the radial inner end of plate 54 and connected to a driver head 114 located beneath drive head 34 when the mold unit is at station 1. The actuator 18 located at the same level as the slide bars 106. The driver head 114 is engagable with drive head 34 to form a disengable connection between driver 30 and the mold clamp drive. Connecting rod 118 joins actuator 112 to vertical yoke 120. The upper end of the yoke is connected to a clamp rod 122 which extends freely through platen support post 124 and engages the outer surface of platen 100 through a stiff spring 126, conventionally a stacked series of dished spring washers.

The lower end of yoke 120 extends through cut-out opening 128 in plate 54 and is connected to first horizontal yoke 130 having ends located outwardly of the side of central cut-out opening 132 also formed in plate 54. A pair of parallel actuating rods 134 are mounted on the lower surface of plate 54 in blocks 136. The inner ends of rods 134 are secured to the outer ends of horizontal yoke 130 to one side of opening 132. The outer ends of the rods are connected to a second horizontal yoke 138 located outwardly of the opening 132.

A double ended pivot bar 140 is rotatably mounted on a projection 142 extending outward from the center of the end block 109. The lower end of bar 140 is connected to a link 144 pivotedly connected to the center of second horizontal yoke 138. The upper end of bar 140 is connected to the clamp rod 146 for outer platen 102 through link 148. The clamp rod 146 extends through a platen support post 150 like post 124 and is connected to the outer surface of platen 102 through stiff spring 152 like spring 126.

Mold units 20 are moved to station 1 with the mold halves open. When at station 1 roller 62 is supported on raised pad 72 so that the unit is in the upper position and a drive connection is formed between heads 34 and 114. The mold halves 98 are moved around the growing resin parisons 154 extending down from the head die 22. Head 22 extrudes one parison for each mold cavity in the mold. Mold halves 98 define three mold cavities 156 for simultaneous blow molding of three bottles.

The mold halves are closed by actuating driver 30 to rotate the shift actuator 112 thereby moving the vertical yoke 120 radially outwardly. Outward movement of the upper end of the yoke moves platen 100 and the inner mold half 98 toward the parisons. Outward movement of the lower end of yoke 120 moves actuating rods 134 outwardly to rotate the lower end of pivot bar 140 outwardly so that upper end of the bar is rotated inwardly a corresponding distance and platen 102 and the outer mold half 98 are moved inwardly toward the parisons. Final closing of the mold halves compresses springs 126 and 152 to control the forces biasing the mold halves against each other.

During closing of the mold halves the driver 30 moves the actuator 112 a slight distance past the fully extended position and against a stop. When in this position springs 126 and 152 hold the mold halves together and the actuator against the stop to prevent opening of the mold halves.

Considerable force is required to hold the mold halves 98 together during blow molding. The force required to close the outer mold half 98 is transmitted from vertical yoke 120 underneath the slide bars 106 and plate 54 and then is transmitted back above the bars and plate to clamp rod 146 by the pivot bar 140. The pivot bar rotates about a pivot axis located at the same vertical level as the slide bars 106. The clamp rods 122 and 146 are located the same distance above the slide bars as the actuating rods 134 are located below the slide bars. This arrangement assures that the slide bars 106 and the plate 54 on which they are mounted are not subjected to high torsional forces when the required high closing forces are applied. These forces are sufficient to bend the slide bars and plate and prevent proper closing of the mold halves.

A blow pin unit 158 is mounted on support frame 60 beneath opening 132 and extends up toward mounting plate 54 through an opening in the support plate 38 (not illustrated). The unit includes a vertically extending blow pin 160 for each mold cavity 156. As shown in FIGS. 3 and 4, unit 158 extends upwardly through the opening so that the blow pins are located adjacent the mouth portions of the inverted blow cavities.

A microprocessor control unit (not illustrated) operates rotary blow molding machine 10 and the extruder or extruders supplying molten resin to extrusion die head 22. The turntable drive indexes the turntable in the direction of arrow 16 45 degrees at a time so that each mold unit 20 is moved in a clockwise direction from a former station to the adjacent clockwise station. Following indexing the drive is deactivated for a dwell period prior to the next indexing step.

The operation of machine 12 is described by following a single mold unit completely around the machine from station 1 through stations 2 through 8 and back to station 1.

When indexed from station 8 to station 1 the mold halves 98 are fully open. The mold halves are rotated to station 1 to either side of the growing parisons 154 extending vertically below the extrusion die head 22. With the turntable drive deactivated and the mold unit dwelling at station 1 the lower ends of the parisons grow down over the upper ends of the blow pins 160. The cylinder 70 is extended so that support pad 72 forms a continuation of the end of lift cam dwell surface 68. See FIGS. 3 and 7. Roller 62 rests on raised pad 72 to hold the mold unit in the elevated position of FIG. 3 with driven head 114 adjacent drive head 34. As soon as the lead ends of the parisons have grown down over the blow pin, driver 30 is actuated to shift the actuator 112 radially outwardly to close the mold halves 98 and capture each parison in a mold cavity.

The extrusion die head 22 is programmable to vary the thickness of the parisons depending upon the blow ratio. The programmer automatically thins the wall sections of the parisons as the mold halves close to provide thin, weak parisons immediately above the closed mold halves. On closing of the mold halves cylinder 70 is rapidly retracted and pad 72 is accelerated down away from roller 62. Rapid retraction of the pad allows the mold unit 20 to gravity-fall from the elevated position of FIG. 3 to the lower position of FIG. 4 where the unit is supported by collars 94. The mold unit free falls until adjustable stops 84 and 86 engage the shock absorber plungers 92 and the shock absorbers slow the descent of the unit until pads 88 and 90 engage resilient pads 96 on the tops of the collars 94.

Initial vertical descent of the closed mold halves breaks the thin portion of the parisons to free the captured parisons in the mold halves from the lwoer end of the newly formed, continuously growing parisons 162. The mold halves fall down faster than the parisons grow. Breakaway of the captured parisons occurs as the mold falls straight down without lateral shifting of the newly forming parisons. Shifting could prevent the growing new parisons from surrounding the blow pins 160 of the next mold unit.

After breakaway of the captured parisons, the controller actuates the drive 18 to rotate the turntable 14 through 45 degrees and index the mold unit from position 1 to position 2. Indexing preferably begins before the unit has fallen onto collars 94. At the same time, a new mold unit with open mold halves is indexed from station 8 to station 1. Cylinder 70 is extended to raise pad 72 to the level of the dwell surface 68 during indexing to support the roller of the mold unit moving to station 1. During indexing, driver 30 is actuated to return drive head 34 to a position for engaging and shifting the actuator of the next mold unit and closing the mold halves of the unit.

Closing of the mold halves captures the lower ends of the parisons between the blow pins and the mouths of the inverted mold cavities. After the mold halves begin to drop pressurized blow air flows through the pins and into the interior of the parisons to blow the parisons against the closed mold halves and form bottles or articles conforming to the shape of the mold cavities.

The mold halves remain closed and the mold unit remains in the lower position supported by collars 94 as the unit is rotated through stations 2, 3, 4, 5 and 6. During this time cooling water flowed through the mold halves cools the expanded parisons to form rigid, cooled bottles or articles. The water flows to and from the mold halves through conduits (not illustrated) joining each mold half to rotary union 28.

Figure 2:
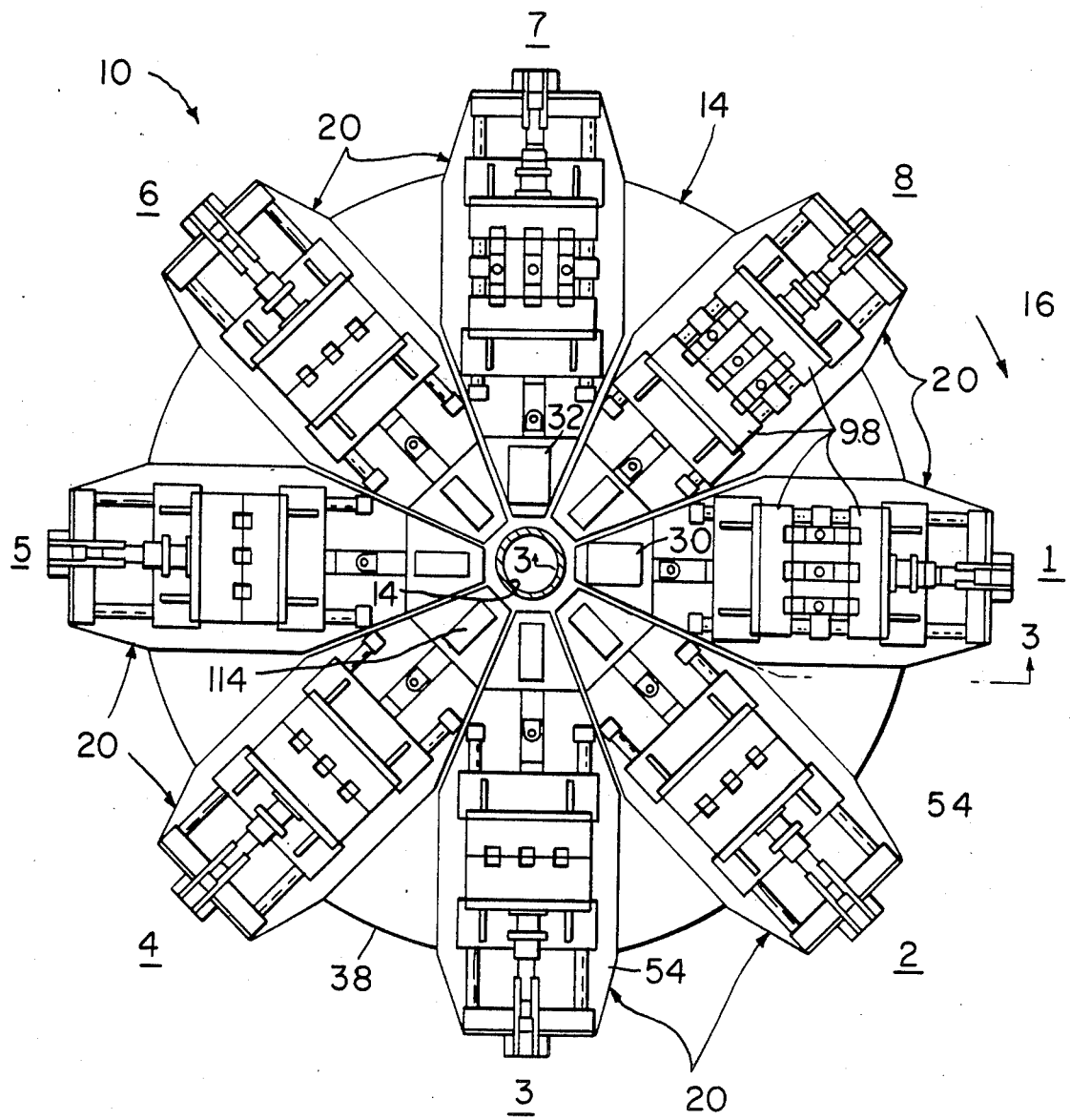
FIG. 2 is a top view of the machine, partially broken away.

During indexing of the turntable to move the mold unit from station 6 to station 7 roller 62 contacts lift cam rise surface 66 and the mold unit is moved up onto dwell surface 68 at station 7. Movement of the mold unit to station 7 moves driver head 114 beneath and into engagement with the drive head 34 of driver 32 shown in FIG. 2. During the dwell period when the mold unit is in station 7 driver 32 is actuated to open the mold halves. Ejection tooling (not illustrated) at station 7 removes the formed and cooled bottles from between the opened mold halves. Driver 32 is returned to the start position as the mold unit is indexed to station 8.

Further indexing of the turntable 14 moves the mold unit to station 8. An in-mold labeling device may be provided at this station to apply labels to the interior walls of the mold cavities 156. The labels become an integral part of the blow molded article in a conventional manner. Subsequent indexing of the turntable returns the open mold unit to station 1 to complete the cycle of operation.

The disclosed blow molding machine 10 includes mold units carrying three cavity mold halves so that three bottles are blow molded by each mold during one cycle of operation. The machine may be used to mold greater or fewer bottles or articles as required. Also, the articles may be blown by blow pins as illustrated or by blow needles where desired.

The captured parisons may be severed from the newly forming parisons 162 using conventional cutting tooling, if required. In such case, it is not necessary to thin the walls of the parisons above the closed mold halves.

In the disclosed example the mold units gravity-fall down from the elevated position. Alternatively, the units may be lowered by a fast acting mechanism or hydraulic drive.

Machine 10 as described blow molds articles in each mold unit. Alternatively, it is possible to run the machine 10 so that articles are blow molded by alternate mold units only with the remaining four unused units left open. In this case drive 18 may index the turntable 90 degrees at a time.

Machine 10 may be set up with four 90 degrees spaced mold units each carrying molds for making one type of bottle or article and the other 90 degrees space mold units carrying molds for making another type of bottle or article. The machine may be run using either set of molds by indexing the turntable 90 degrees between dwells and leaving the other unused molds open. This flexibility is particularly useful when bottles or articles are made in short production runs or when the production facility includes only a single blow molding machine. If desired, the machine may be run using both sets of the molds to make different types of articles or bottles during a single production run.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim as our invention is:

1. A rotary blow molding machine comprising:
   (a) A base;
   (b) A turntable rotatably mounted on the base;
   (c) A plurality of mold units mounted on and spaced around the turntable, each mold unit including a pair of mold halves defining a blow mold cavity when closed, and mold clamp drive means for opening the closed mold halves to permit removal of a blow molded article at an ejection station and for closing the open mold halves at an extrusion station to capture a parison within the mold cavities;
   (d) A turntable drive for moving the turntable around the base in steps to index the mold halves between stations spaced around the machine, the stations including an extrusion station and an ejection station;
   (e) An extrusion die head mounted relative to the base above the extrusion station in a fixed circumferential location and operable to extrude a continuously growing resin parison down into the extrusion station;
   (f) Vertical positioning means at the extrusion station for holding each mold unit indexed to the extrusion station in an elevated position so that the open mold halves move to either side of a parison growing down from the extrusion die head prior to closing of the mold halves and capture of the parison, and for lowering the mold units and closed mold halves vertically down from the elevated position faster than the rate of downward parison growth;
   (g) Parison separation means at the extrusion station for severing the captured parison from a new parison growing from the extrusion die head;
   (h) Blow means for expanding the captured parison against the mold cavity; and
   (i) Mold unit rise means for raising each mold unit to the elevated position prior to return of the mold unit to the extrusion station; whereby a parison is captured between closed mold halves, separated from the new parison and blow molded against the cavity as each mold unit is rotated around the base.

2. A rotary blow molding machine as in claim 1 wherein the extrusion head is fixed against radial and vertical movement.

3. A rotary blow molding machine as in claim 2 wherein said parison separation means comprises means for reducing the wall thickness of the parison above the closed mold halves whereby movement of the mold halves down from the elevated position breaks the parison at the reduced thickness wall.

4. A rotary blow molding machine as in claim 2 wherein said parison separation means comprises a knife operable to sever the parison above the closed mold halves.

5. A rotary blow molding machine as in claim 2 wherein said vertical positioning means comprises a mechanism for lowering the mold unit.

6. A rotary blow molding machine as in claim 2 wherein said vertical positioning means comprises a support surface engagable with a support member on the mold unit to hold the mold unit in the elevated position during rotation to the extrusion station; connection means for joining each mold unit to the turntable while permitting vertical movement of the mold units relative to the turntable; and a support at the extrusion station holding the mold unit in the elevated position until the mold halves close on the parison and means for withdrawing the support thereafter to permit the mold unit to gravity-fall away from the extrusion head die.

7. A rotary blow molding machine as in claim 2 wherein the turntable includes a support at each mold unit and each mold unit includes a mounting plate above the support, a pair of slide bars mounted on the top of the mounting plate, slidable connections joining said mold halves to the slide bars for movement toward and away from each other, connection means joining each mounting plate to the adjacent support while permitting vertical movement of the mounting plate, and a mold unit support surface located below the support; said vertical positioning means including a pad engagable with said surface and means for removing the pad from said surface to permit the mold unit to gravity-fall away from the extrusion die head.

8. A rotary blow molding machine as in claim 2 including drive means for the clamp means, and wherein such means includes first drive means on the base at the ejection station for opening the mold halves, second drive means on the base at the extrusion station for closing the mold halves, and disengable drive connections joining such means and the mold clamp means of the mold units located at such stations.

9. A rotary blow molding machine comprising:
(a) A base,
(b) A turntable mounted on the base for rotation about a vertical axis, the turntable including a horizontal support plate,
(c) A plurality of mold units mounted on and spaced around the support plate, each mold unit including a mounting plate above the support plate, a vertical slide connection joining the plates, whereby the mounting plate is vertically movable between elevated and lowered positions, a lift member joined to the mounting plate, a pair of mold halves defining a mold cavity when closed, a slide connection securing the mold halves to the upper surface of the mounting plate so that the mold halves may be moved between opened and closed positions, and mold clamp means for opening the closed mold halves to permit removal of a blow molded article at an ejection station and for closing the open mold halves at an extrusion station to capture a parison within the mold cavities;
(d) A turntable drive for moving the turntable around the base in steps to index the mold units between stations spaced around the machine including an extrusion station and an ejection station;
(e) An extrusion head die mounted relative to the base above the extrusion station in a fixed circumferential location and operable to extrude a continuously growing resin parison down into the extrusion station;
(f) A lift cam on the base extending partially around the circumference of the machine beneath the mounting plate, the lift cam including an end at the extrusion station and a rise surface engagable with the lift member remote from the extrusion station for lifting the mold unit from the lowered position to the elevated position prior to movement to the extrusion station;
(g) A support pad beneath the mounting plate at the extrusion station;
(h) Support pad drive means for moving the pad vertically between an upper position adjacent the end of the lift cam for supporting mold unit at the extrusion station in the elevated position so that lowering of the support pad lowers the mold unit at the extrusion station vertically away from the extrusion head;
(i) Parison separation means operable so that a parison captured between the mold halves at the extrusion station is separated from a new parison growing from the extrusion die head above the closed mold halves as a mold unit is vertically lowered; and
(j) Blow means for expanding a captured parison against the mold cavity; whereby a parison is captured between the closed mold halves of each mold unit at the extrusion station, separated from the new parison and blow molded against the cavity as the mold units are rotated around the base.

10. A rotary blow molding machine as in claim 9 wherein the lift member comprises a roller.

11. A rotary blow molding machine as in claim 9 wherein the support pad drive means moves the support pad away from the roller to allow the mold unit to gravity-fall from the elevated position to the lowered position.

12. A rotary blow molding machine as in claim 11 wherein each mold unit includes a frame below the support plate, the vertical slide connection means comprises a plurality of bushings on the support plate and a plurality of vertical slide bars extending through the bushings and joined at their ends to the mounting plate and the frame, lift member roller being mounted on the frame and wherein the lift cam is located below the frame.

13. A rotary blow molding machine as in claim 12 wherein the lift cam includes a dwell surface extending from the ejection station to said end of the cam.

14. A rotary blow molding machine as in claim 13 including shock absorbing means on the turntable for slowing the descent of the mold units.

15. A rotary blow molding machine as in claim 9 wherein said mold clamp means includes an actuator on the radial inner end of the mounting plate, a pivot bar on the radial outer end of the mounting plate, the pivot bar having a pivot connection at the level of the slide connection and upper and lower ends, a first connection joining the actuator to one mold half located a first distance above the slide connection, a second connection joining the actuator to the lower end of the pivot bar located a second distance below the slide connection, and a third connection joining the upper end of the pivot bar to the other mold half located a third distance above the slide connection, all of said distances being equal, whereby upon radial outward movement of the actuator the first connection moves said one mold half radially outwardly, said second connection moves the lower end of the pivot bar radially outwardly to pivot the bar about the pivot connection and move the upper end of the pivot bar radially inwardly, and the third connection moves the other mold half radially inwardly so that the mold halves are closed without subjecting the slide connection to substantial torsional loading.

16. A rotary blow molding machine as in claim 15 wherein the pivot bar is connected directly to the outer end of the slide connection.

17. A rotary blow molding machine as in claim 15 wherein the second connection is located below the mounting plate.

18. A rotary blow molding machine as in claim 17 wherein the upper and lower ends of hte pivot bar are of equal length.

19. A rotary blow molding machine as in claim 15 wherein the mold clamp includes a vertical yoke connected to the actuator and having an upper end above the slide connection and a lower end below the slide connection, the upper end of the yoke forming part of the first connection and the lower end of the yoke forming part of the second connection.

20. A rotary blow molding machine as in claim 19 wherein the machine blow molds bottles and the cavities in the mold halves include first neck openings at the bottoms of the mold halves, each mold unit including a blow pin unit below the mounting plate including a blow pin vertically below the extrusion die head when the mold unit is in the extrusion station so that the parison grows down onto the pin and the pin and parison are captured in the neck opening when the mold halves are closed, and a second opening in the mounting plate below the extrusion head, the blow pin unit extending through such second opening, and wherein the second connection includes a first horizontal yoke joined to the lower end of the vertical yoke and having ends located outside of the inner end of the second opening, a second horizontal yoke joined to the lower end of the pivot bar and having ends outside of the outer end of the second opening and a pair of connections outside of the second opening joining the ends of the horizontal yokes.

21. A blow molding machine comprising:
(a) A mold unit including a pair of mold halves defining a mold cavity when closed,
(b) A drive for moving the mold unit horizontally to a number of stations including an extrusion station and an ejection station,
(c) A fixed extrusion die head located above the extrusion station and operable to extrude a continuously growing resin parison vertically down into the extrusion station,
(d) Mold clamp means for opening the mold halves to permit removal of a blow article at the ejection station and for closing the open mold halves at the extrusion station to capture a parison within the mold cavity,
(e) Vertical positioning means for both (1) holding the mold unit in an elevated position when moved to the extrusion station so that the open mold halves move to either side of the parison growing down from the extrusion die head prior to closing of the mold halves and capture of the parison and (2) releasing the mold unit so that it gravity falls vertically down from the elevated position faster than the rate of parison growth,
(f) Parison separation means operable so that the captured parison is separated from the new parison growing from the extrusion head above the mold halves,
(g) Blow means for expanding the captured parison against the mold cavity, and
(h) Mold unit rise means located away from the extrusion station for raising the mold unit to the elevated position prior to return of the mold unit to the extrusion station, whereby the parison is captured between the closed mold halves, separated from the new parison and then blow molded against the cavity as the mold unit is moved between the stations.

22. A blow molding machine as in claim 21 wherein said parison separation means comprises means for reducing the wall thickness of the parison above the closed mold halves whereby movement of the mold halves down from the elevated position breaks the parison at the reduced thickness wall.

23. A blow molding machine as in claim 21 wherein said parison separation means comprises a knife operable to sever the parison above the closed mold halves.

24. A blow molding machine as in claim 21 wherein the mold unit rise means includes a lift cam.

25. A blow molding machine as in claim 21 wherein said vertical positioning means comprises a support surface engagable with a support member on the mold unit to hold the mold unit in the elevated position during movement to the extrusion station, the support member being located under the center of gravity of the mold unit; connection means for permitting vertical movement of the mold unit; and a support at the extrusion station holding the mold unit in the elevated position until the mold halves close on the parison and means for withdrawing the support thereafter to permit the mold unit to gravity-fall away from the extrusion head die.

26. A mold unit for a blow molding machine comprising a plate, a pair of mold halves on one side of the plate, the mold halves defining a blow mold cavity when closed, a slide connection mounting the mold halves on the plate while allowing movement of the mold halves toward and away from each other, an actuator on the plate to one side of the mold halves, a pivot bar on the plate to the other side of the mold halves having a pivot connection at the level of the side connection and two ends, a first connection joining the actuator to an adjacent mold half at a first distance above the slide connection, a second connection located a second distance below the side connection joining the actuator to one end of the pivot bar, and a third connection joining the other end of the pivot bar to the other mold half at a third distance above the slide connection, all of said distances being approximately equal, whereby upon movement of the actuator toward the pivot bar the first connection moves said one mold half toward the other mold half, said second connection moves the lower end of the pivot bar outwardly to pivot the bar about the pivot connection and move the upper end of the pivot inwardly, and the third connection moves the other mold half toward said one mold half so that the mold halves are closed without subjecting the slide connection to substantial torsional loading.

27. A mold unit as in claim 26 wherein the second connection is located below the plate.

28. A mold unit as in claim 27 wherein the ends of the pivot bar are of equal length.

29. A mold unit as in claim 26 including a vertical yoke connected to the crank and having one end above the slide connection and the other end below the slide connection, the one end of the yoke forming part of the first connection and the lower end of the yoke forming part of the second connection.

30. A mold unit as in claim 29 wherein said second connection is located below the plate.

* * * * *